United States Patent [19]

Sakamoto et al.

[11] Patent Number: 5,624,761
[45] Date of Patent: Apr. 29, 1997

[54] FIRE-PROTECTION AND SAFETY COMPOSITE GLASS PANEL

[75] Inventors: Akihiko Sakamoto; Tadashi Takahashi, both of Shiga-ken; Masayuki Ninomiya, Osaka-fu, all of Japan

[73] Assignee: Nippon Electric Glass Co., Ltd., Osaka-fu, Japan

[21] Appl. No.: 555,764

[22] Filed: Nov. 9, 1995

[30] Foreign Application Priority Data

Nov. 9, 1994 [JP] Japan ................... 6-301363

[51] Int. Cl.⁶ ........................................ B32B 9/00
[52] U.S. Cl. .................... 428/426; 428/38; 428/178; 428/332; 428/412; 428/408; 428/415; 428/417; 428/421; 428/422; 428/441; 428/442; 428/473.5; 428/913
[58] Field of Search ................... 428/421, 442, 428/412, 415, 417, 426, 38, 913, 408, 441, 332, 422, 178, 473.5

[56] References Cited

U.S. PATENT DOCUMENTS

| | | | |
|---|---|---|---|
| 4,341,841 | 7/1982 | Ohno et al. | 428/414 |
| 4,606,955 | 8/1986 | Eastman et al. | 428/36 |
| 5,230,954 | 7/1993 | Sakamoto et al. | 428/332 |

*Primary Examiner*—Patrick Ryan
*Assistant Examiner*—Abraham Bahta
*Attorney, Agent, or Firm*—Hopgood, Calimafde, Kalil & Judlowe

[57] ABSTRACT

A fire-protection and safety composite glass panel includes a fireproof glass plate and a film of fluorocarbon resin of a chain molecular structure type. The film is bonded onto one of opposite side surfaces of the fireproof glass plate by the thermo-compression bonding. The fluorocarbon resin is a copolymer of at least three kinds of monomers. It may be arranged that another film of the fluorocarbon resin is further bonded onto the other side surface of the fireproof glass plate by the thermo-compression bonding. Another glass panel may be arranged that a plurality of fireproof glass plates are attached with a film of the foregoing fluorocarbon resin interposed between adjacent glass plates through the thermo-compression bonding. Those glass panels can be used as glass plates in fire-protective windows and doors.

9 Claims, 3 Drawing Sheets

FIRE-PROTECTION AND SAFETY COMPOSITE GLASS PANEL

BACKGROUND OF THE INVENTION

The present invention relates to a fire-protection and safety composite glass panel having nonshattering property as well as fire resistant or fireproof property and, in particular, to such a glass panel comprising a fireproof glass plate and a fluorocarbon resin film of a chain molecular structure type laminated onto the glass plate for providing the nonshattering property.

In light of the recent expansion of large-sized buildings, such as department stores and supermarkets, the demand for such glass panels has increased. That is, to say a fireproof or fire-resistant property is required, such as a fire door, for blocking flame and smoke upon occurrence of fire. Thus to prevent the spread of fire, a nonshattering or shatter-resistant property is necessary for a safety glass plate for preventing damage or, shattering of cracked pieces to avoid generation of through holes therein.

For a fireproof glass plate to be used as a fire door, there has been available, for example, a wire glass plate or a heat-resistant transparent crystallized glass plate.

On the other hand, for a safety glass plate, there has been available, for example, a tempered glass plate, a laminated glass or a glass plate coated with a resin film.

The tempered glass plate is advantageous in that it is capable of resisting constant impact, and even if the plate is broken, the broken pieces are small enough to minimize the possibility of injury. On the other hand, it can be dangerous because the breaking of the glass plate can result in a through hole.

In view of this, the laminated glass plate or the resin-film coated glass plate having the nonshattering or shatter-resistant property is preferable to the tempered glass plate in that the demand for these nonshattering glass plates has been increasing as compared with the use of tempered glass plate.

A fire-protection and safety composite glass panel having both the fireproof property and the nonshattering property is disclosed in U.S. Pat. No. 5,230,954 (corresponding to JP-A-H04-224938 and JP-A-H05-70190) and has been provided for actual use.

The fire-protection and safety composite glass panel disclosed in the foregoing United States Patent is formed by bonding a fluorocarbon resin film of a chain molecular structure type onto at least one of opposite side surfaces of the heat-resistant transparent crystallized glass plate. The resultant composite glass panel has excellent characteristics in terms of the fireproof property and the nonshattering property. However, the manufacturing of such a composite glass panel presents a problem.

Specifically, the fluorocarbon resin film can be attached onto the glass plate using an adhesive or through thermo-compression bonding. With respect to using the adhesive, a material and a surface configuration of the adhesive should be strictly controlled such that it is laborious to assure quality control of the adhesive.

In case of the thermo-compression bonding, since a melting point of the fluorocarbon resin is higher than that of a polyvinyl butyral (PVB) resin or the like to be used for the normal laminated glass plate, a higher temperature is necessary for the bonding. Thus, special thermo-compression bonding equipments are required which increases the manufacturing cost of the fire-protection and safety composite glass panel.

In addition to the foregoing manufacturing problem, it is rather difficult to obtain the fluorocarbon resin of this type with high light transparency. Accordingly, if the fluorocarbon resin film of a large thickness is used, the resultant fire-protection and safety composite glass panel has slightly milky or opaline appearance and deteriorates in light transmittance.

SUMMARY OF THE INVENTION

Therefore, it is an object of the present invention to provide an improved and economical fire-protection and safety composite glass panel.

It is another object of the present invention to provide a fire-protection and safety composite glass panel using a fluorocarbon resin film of a chain molecular structure type which has a high light transparence and can be easily manufactured through the thermo-compression bonding.

According to one aspect of the present invention, a fire-protection and safety composite glass panel is provided comprising a fireproof glass plate having opposite side surfaces; and a film of fluorocarbon resin of a chain molecular structure type, the film being bonded on one of the opposite side surfaces, and wherein the fluorocarbon resin is a copolymer of at least three kinds of different monomers.

Another film of the fluorocarbon resin may be bonded on the other side surface of the fireproof glass plate.

According to another aspect of the present invention, a fire-protection and safety composite glass panel comprises a plurality of fireproof glass plates with a film of fluorocarbon resin interposed between adjacent glass plates, the fluorocarbon resin having only a chain molecular structure, wherein the fluorocarbon resin is a copolymer of at least three kinds of different monomers.

The different monomers used for the copolymer are preferably tetrafluoroethylene, hexafluoropropylene and vinylidene fluoride.

According to further aspect of the present invention, a fire protective door or window is obtained which comprises the composite glass panel and a frame for supporting the composite glass panel.

DESCRIPTION OF THE INVENTION

Figure 1:
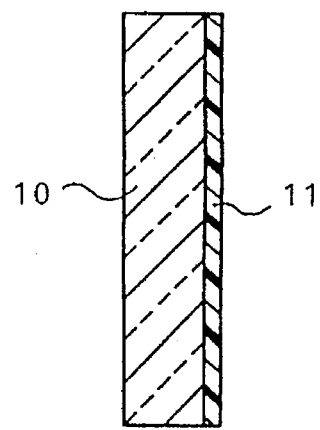
FIG. 1 is a sectional view of a sample obtained in Example 1 according to the present invention.

The present invention attempts to provide a nonshattering or shatter-resistant property to a fireproof or fire-resistant glass plate by laminating thereto a fluorocarbon resin film which is a chain molecular structure type and is a copolymer of at least three kinds of monomers.

Due to a strong interatomic binding of carbon-fluorine and a barrier effect of fluorine atoms covering the carbon chain, the fluorocarbon resin film of the chain molecular structure type is incombustible in the air.

Further, the fluorocarbon film of this type has a high polymerization degree and thus a complicated structure as compared with fluorocarbon resin films of other molecular structures. Accordingly, the fluorocarbon film of this type has the large extensible and tensile strength so that bonding it onto a glass plate can provide a glass panel which is excellent in impact absorptivity and nonshattering property.

Further, by selecting a thickness and/or a material of the fluorocarbon resin film of this type, a desired impact resistance can be achieved. For this purpose, a thickness of 0.02–1 mm is preferable.

Further, the fluorocarbon resin formed by copolymerizing at least three kinds of monomers has a low melting point at 110°–180° C., while keeping the foregoing excellent properties. Therefore, the thermo-compression bonding can be achieved for the fluorocarbon resin film used in the present invention at a temperature approximate to that for the PVB resin film so that the special or expensive thermo-compression bonding equipments are not required.

On the other hand, a fluorocarbon resin film formed of monomers of one or two kinds has a melting point of 200°–330° C. which is considerably higher than a melting point of the PVB resin film (about 130° C.) used in the laminated glass plate.

Furthermore, by controlling a copolymerization rate of three or more kinds of monomers, the resultant fluorocarbon copolymer resin film with higher light transparency can be achieved as compared with the fluorocarbon resin film formed of monomers of one or two kinds.

As monomers forming the fluorocarbon resin film used in the present invention, for example, tetrafluoroethylene (TFE), hexafluoropropylene (HFP), vinylidene fluoride (VDF), polychlorofluoroethylene (PCTFE), vinyl fluoride (VF), perfluoroalkyl vinyl ether (PFA) and others may be used. In particular, the fluorocarbon resin of a copolymer of the monomers of tetrafluoroethylene (TFE), hexafluoropropylene (HFP) and vinylidene fluoride (VDF) is preferable since its melting point is low.

The fireproof glass plate used in the present invention may be a transparent glass plate, such as a heat-resistant crystallized glass plate, a wire glass plate, a tempered borosilicate glass plate or the like, which passes the fire protecting test according to the Notification No. 1125 of the Ministry of Construction of Japan. In view of heat resistance and appearance, it is most preferable to use a heat-resistant transparent crystallized glass plate having a thermal expansion coefficient of $-10 \times 10^{-7}/°$ C. to $10 \times 10^{-7}/°$ C.

As one of the crystallized glass, "FIRELITE" glass plate is available in commerce, which is made by Nippon Electric Glass Co., Ltd., a corporation in Japan. The crystallized glass is disclosed in U.S. Pat. No. 3,282,712 and consists of 3–5 wt. % $Li_2O$, 20–35 wt. % $Al_2O_3$, 55–70 wt. % $SiO_2$, 1–3 wt. % $TiO_2$, 1–4 wt. % $ZrO_2$, 1–5 wt. % $P_2O_5$, 0–4 wt. % $Na_2O$, and 0–4 wt. % $K_2O$ but a total amount of $Na_2O$ and $K_2O$ being 0.5–4 wt. %.

Now, examples of the present invention and comparative examples will be described hereinbelow.

Example 1

First, a film of 250 μm thickness was prepared of a fluorocarbon resin which was a chain molecular structure type and formed of a copolymer of 40 weight % of tetrafluoroethylene (TFE), 20 weight % of hexafluoropropylene (HFP) and 40 weight % of vinylidene fluoride (VDF). Further, a heat-resistant transparent crystallized glass plate with a dimension of 2000×900×5 mm was also prepared of the "FIRELITE" which had a thermal expansion coefficient of $-5 \times 10^{-7}/°$ C.

Subsequently, as shown in FIG. 1, the foregoing fluorocarbon resin film 11 was attached onto one side surface of the FIRELITE glass plate 10 by the thermo-compression bonding so as to obtain a sample of a fire-protection and safety composite glass panel. The thermo-compression bonding was performed at a predetermined temperature under pressure of 12 kgf/cm² for 15 minutes. The predetermined temperature represents a temperature which is required for achieving a sufficient bonded state between the glass plate and the film and indicated in Table 1 as a thermo-compression bonding temperature.

Example 2

Figure 2:
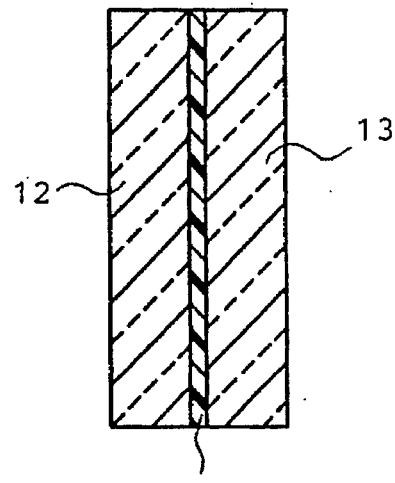
FIG. 2 is a sectional view of a sample obtained in Example 2 according to the present invention.

Two plates of the "FIRELITE" glass and a film of the fluorocarbon resin were prepared similar to those in Example 1. Subsequently, as shown in FIG. 2, the film 14 was interposed between the FIRELITE glass plates 12 and 13 to obtain another sample of a fire-protection and safety composite glass panel through the thermo-compression bonding. The thermo-compression bonding was performed at a different thermo-compression bonding temperature shown in Table 1 under pressure of 12 kgf/cm² for 15 minutes.

Comparative Example 1

Figure 3:
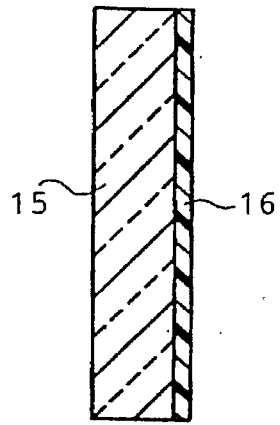
FIG. 3 is a sectional view of a comparative sample obtained in Comparative Example 1.

A FIRELITE glass plate was prepared similar to that in Example 1, while a film of 250 μm was prepared of a fluorocarbon resin film which was a chain molecular structure type and formed of a copolymer of 80 weight % tetrafluoroethylene (TFE) and 20 weight % hexafluoropropylene (HFP). Subsequently, as shown in FIG. 3, the film 16 was attached onto one side surface of the FIRELITE glass plate 15 by the thermo-compression bonding so as to obtain a comparative sample of a fire-protection and safety composite glass panel. The thermo-compression bonding was performed at a different thermo-compression bonding temperature shown in Table 1 under pressure of 12 kgf/cm² for 15 minutes.

Comparative Example 2

Figure 4:
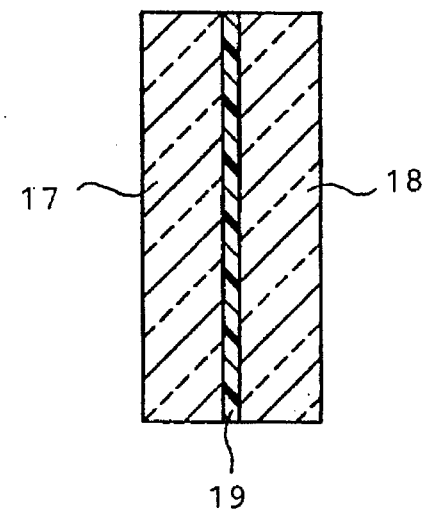
FIG. 4 is a sectional view of a comparative sample obtained in Comparative Example 2.

Two FIRELITE glass plates similar to that in Example 1 and a fluorocarbon resin film similar to that in Comparative Example 1 were prepared. Subsequently, as shown in FIG. 4, the film 19 was interposed between the FIRELITE glass plates 17 and 18 to obtain another comparative sample of a fire-protection and safety composite glass panel through the thermo-compression bonding. The thermo-compression bonding was performed at a different thermo-compression bonding temperature shown in Table 1 under pressure of 12 kgf/cm² for 15 minutes.

As appreciated from Table 1, the thermo-compression bonding temperature of the fluorocarbon resin films is 120° C. and 140° C. in Examples 1 and 2, respectively, but 280° C. and 300° C. in Comparative Examples 1 and 2, respectively. Accordingly, the thermo-compression bonding can be achieved at the lower temperature in Examples 1 and 2 according to the present invention.

TABLE 1

|  | Ex. 1 | Ex. 2 | Compar. Ex. 1 | Compar. Ex. 2 |
| --- | --- | --- | --- | --- |
| Thermo-Compression Bonding Temperature (°C.) | 120 | 140 | 280 | 300 |
| Appearance | Transp. | Transp. | Slightly Opaline | Slightly Opaline |
| Impact Resistance (cm) | 80 | 140 | 80 | 140 |
| Fire Protection | Good | Good | Good | Good |

Further, when visually observing appearance of the samples and comparative samples of the composite glass panels, it was confirmed that the samples of Examples 1 and 2 were excellent in transparency, while the comparative samples of Comparative Examples 1 and 2 were slightly opaline.

On the other hand, all the samples and comparative samples were confirmed to have good impact resistance and good fire resistance by an impact resistance test and a fire resistance test, respectively.

The impact resistance test will be described referring to FIG. 5.

Figure 5:
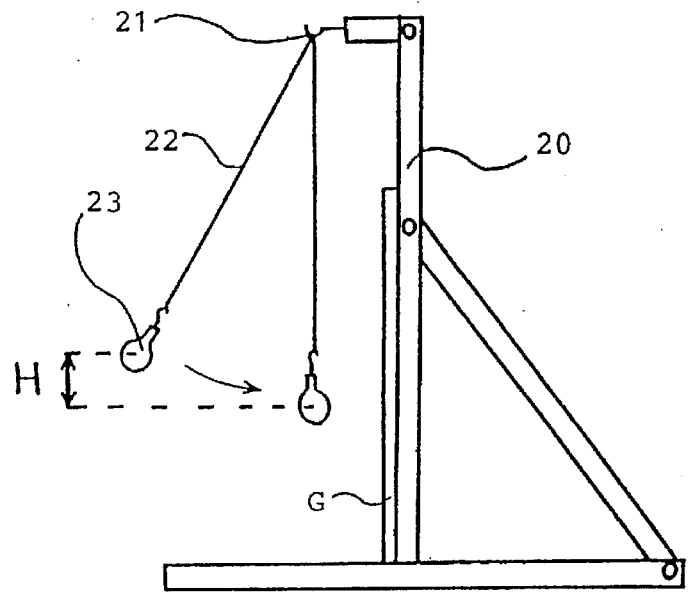
FIG. 5 is a diagram for explaining a method of measuring impact resistances of the samples and the comparative samples.

In FIG. 5, each of the samples and comparative samples is fixed, as a test piece G at a predetermined position of an iron frame 20. The frame 20 has a hook 21 on its top to which an end of a wire 22 is connected while a weight 23 with 45 kg mass being connected to the other end of the wire 22. A distance is set to 1524 mm from the hook 21 to the centroid of the weight 23. The weight 23 and the wire 22 are then turned about the hook 21 so that the weight 23 is raised by a level H from an initial position where the wire is vertically suspended. Subsequently, the weight 23 is released to collide with the test piece G. The collision is repeated with gradual increase of the level H. The impact resistance is represented by the maximum level of H before a total weight of fallen-off broken glass fragments exceeds 50 grams.

The fire resistance test was performed by heating each sample or comparative sample, using a gas heating furnace, according to a standard heating curve specified in the Notification No. 1125 of the Ministry of Construction of Japan. None of the samples and comparative samples was broken over three hours.

Figure 6:
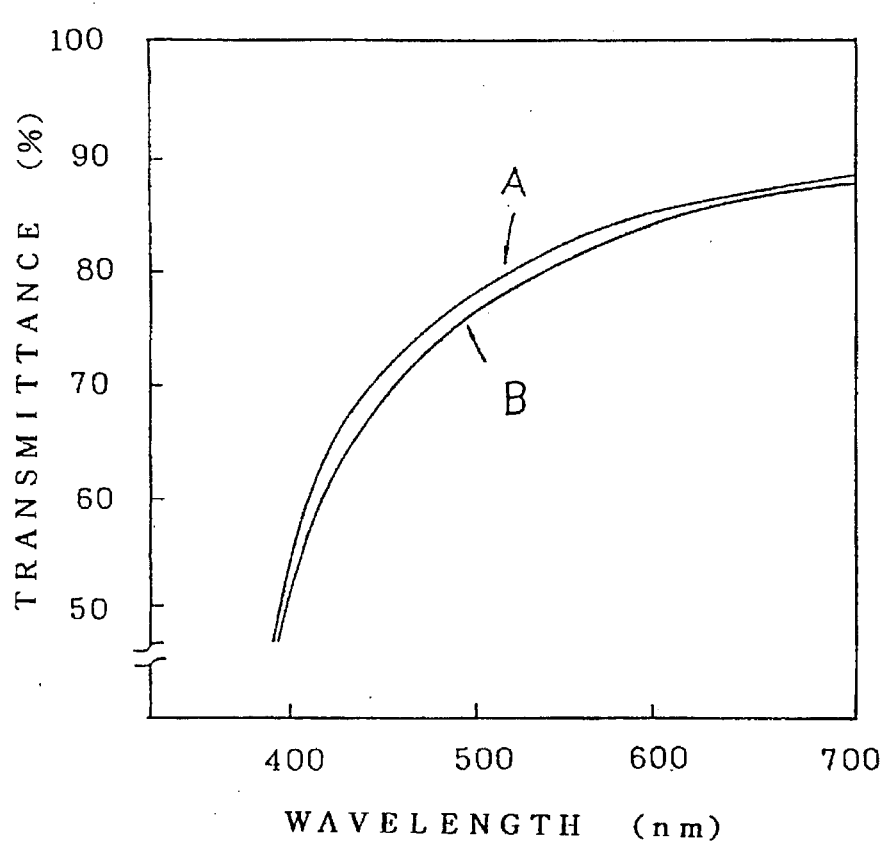
FIG. 6 is a graph showing visible light transmittance of the sample in Example 2 and the comparative sample in comparative Example 2.

FIG. 6 shows a visible light transmittance of the sample and the comparative sample in Example 2 and Comparative Example 2, which was a result of measurement by using a spectrophotometer. In the figure, a curve A represents a transmittance of the sample of Example 2, while a curve B represents that of the comparative sample of Comparative Example 2. As appreciated, the sample of Example 2 has the higher transmittance than the comparative sample of Comparative Example 2 over the range of visible light.

In the foregoing Example 1, the fluorocarbon resin film 11 is attached onto only one side surface of the FIRELITE glass plate 10 by the thermo-compression bonding. It will be understood that another fluorocarbon resin film which is similar to the fluorocarbon resin film 11 may also be attached to the other side surface of the glass plate 10 in the same manner.

In the foregoing Example 2, only the two FIRELITE glass plates 12 and 13 are attached with the film 14 interposed therebetween through the thermo-compression bonding. It will also be understood that a further glass plate may be attached to the sample in Example 2 with another fluorocarbon resin film, which is similar to the film 14, interposed therebetween.

Figure 7:
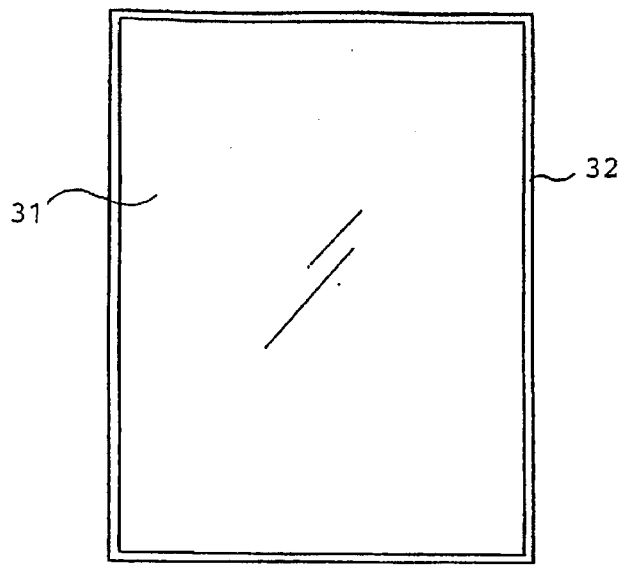
FIG. 7 is a front view of a fire-protective window using the composite glass panel according to the present invention.

Referring to FIG. 7, a window is shown which comprises a glass plate 31 and a sash 32 for the glass plate 31. The composite glass panel according to the present invention is used for the glass plate so that the window is a fire protective and safety window.

Figure 8:
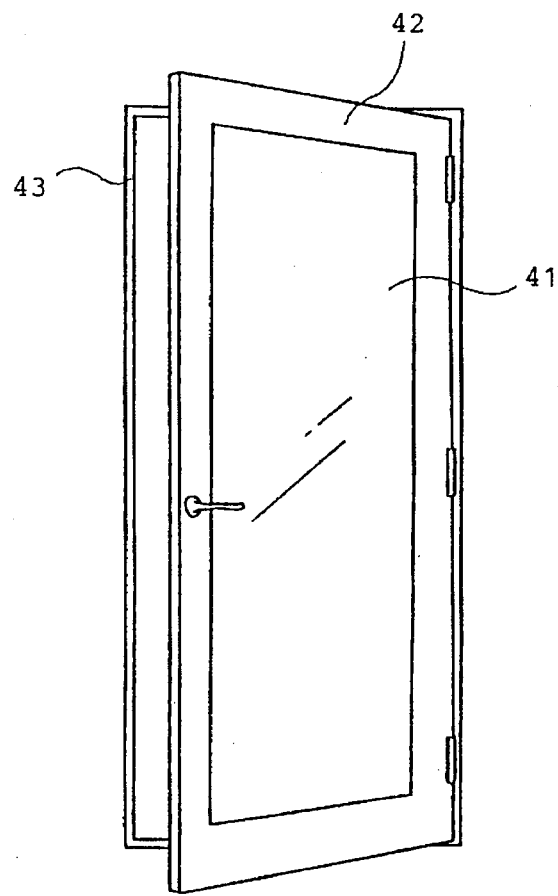
FIG. 8 is a front view of a fire-protective door using the composite glass panel according to the present invention.

Referring to FIG. 8, a fire protective and safety door is also shown which comprises a glass plate 41 made of the composite glass panel and a door frame 42. The door is installed in an opening 43.

What is claimed is:

1. A fire-protection and safety composite glass panel comprising:
    a fireproof glass plate having opposite side surfaces; and
    a film of fluorocarbon resin of a chain molecular structure type, said film bonded on one of said opposite side surfaces,
    wherein said fluorocarbon resin is a copolymer of at least three kinds of monomers.

2. The composite glass panel according to claim 1, wherein another film of said fluorocarbon resin is bonded on the other side surface of said fireproof glass plate.

3. The composite glass panel according to claim 1, wherein said monomers are tetrafluoroethylene, hexafluoropropylene and vinylidene fluoride.

4. A fire-protection and safety composite glass panel comprising:
    a plurality of fireproof glass plates with a film of fluorocarbon resin of a chain molecular structure type interposed between adjacent glass plates,
    wherein said fluorocarbon resin is formed of a copolymer of at least three kinds of monomers.

5. The composite glass panel according to claim 4, wherein said monomers are tetrafluoroethylene, hexafluoropropylene and vinylidene fluoride.

6. A fire protective window comprising a window glass and a sash for said window glass, said window glass comprising a fireproof glass plate with opposite side surfaces and a film of fluorocarbon resin of a chain molecular structure type, said film bonded on one of said opposite side surfaces, wherein said fluorocarbon resin is a copolymer of at least three kinds of monomers.

7. A fire protective window as claimed in claim 6, wherein said window glass comprises a plurality of glass plates laminated with a layer of the fluorocarbon copolymer resin film of the chain molecular structure type between adjacent glass plates, at least one of said glass plates being a fireproof glass plate.

8. A fire protective door comprising a glass panel and a frame for said glass panel, said glass panel comprising a fireproof glass plate with opposite side surfaces and a film of fluorocarbon resin of a chain molecular structure type, said film bonded on one of said opposite side surfaces, wherein said fluorocarbon resin is a copolymer of at least three kinds of monomers.

9. A fire protective door as claimed in claim 8, wherein said glass panel comprises a plurality of glass plates laminated with a layer of the fluorocarbon copolymer resin film of the chain molecular structure type between adjacent glass plates, at least one of said glass plates being a fireproof glass plate.

* * * * *